US 11,240,823 B2

(12) United States Patent
Sun et al.

(10) Patent No.: US 11,240,823 B2
(45) Date of Patent: Feb. 1, 2022

(54) WIRELESS COMMUNICATION METHOD AND WIRELESS COMMUNICATION DEVICE FOR MANAGING INTERFERENCE BETWEEN MULTIPLE DEVICES (71) Applicant: Sony Corporation, Tokyo (JP)

(72) Inventors: Chen Sun, Beijing (CN); Xin Guo, Beijing (CN)

(73) Assignee: SONY CORPORATION, Tokyo (JP)

(*) Notice: Subject to any disclaimer, the term of this patent is extended or adjusted under 35 U.S.C. 154(b) by 179 days.

(21) Appl. No.: 16/628,032

(22) PCT Filed: Sep. 13, 2018

(86) PCT No.: PCT/CN2018/105429
§ 371 (c)(1),
(2) Date: Jan. 2, 2020

(87) PCT Pub. No.: WO2019/056975
PCT Pub. Date: Mar. 28, 2019

(65) Prior Publication Data
US 2020/0221465 A1 Jul. 9, 2020

(30) Foreign Application Priority Data

Sep. 20, 2017 (CN) .......................... 201710852689.4

(51) Int. Cl.
*H04W 72/08* (2009.01)
(52) U.S. Cl.
CPC ................................ *H04W 72/082* (2013.01)
(58) Field of Classification Search
CPC ... H04W 72/082; H04W 16/10; H04W 52/04; H04W 16/14; H04W 52/367;
(Continued)

(56) References Cited

U.S. PATENT DOCUMENTS

2010/0061351 A1* 3/2010 Lee ...................... H04W 52/242
370/338
2010/0093364 A1* 4/2010 Ribeiro ............... H04W 72/082
455/452.2
(Continued)

FOREIGN PATENT DOCUMENTS

CN 102223652 A 10/2011
CN 104427509 A 3/2015
(Continued)

OTHER PUBLICATIONS

International Search Report and Written Opinion dated Dec. 5, 2018 for PCT/CN2018/105429 filed on Sep. 13, 2018, 8 pages including English Translation of the International Search Report.

*Primary Examiner* — Mewale A Ambaye
(74) *Attorney, Agent, or Firm* — Xsensus LLP (57) ABSTRACT A wireless communication method and a wireless communication device for managing multiple systems causing interference to a reference point, the device including one or more processors, the processors being able to: acquire a total amount of interference that is allowed to be caused by the multiple systems at the reference point, determined by another device. On the basis of the acquired total amount of interference, the method includes determining a communication resource for each of the multiple systems, such that the interference caused at the reference point by the multiple systems when communicating using the communication resources is different and the sum of interference caused by the multiple systems does not exceed the total amount of interference; and notifying each system of the corresponding communication resource determined for the system.

12 Claims, 7 Drawing Sheets (58) Field of Classification Search
CPC . H04W 52/58; H04W 28/18; H04W 72/0446; H04W 72/0453; H04W 74/0808
See application file for complete search history.

(56) References Cited

U.S. PATENT DOCUMENTS

| | | | | |
|---|---|---|---|---|
| 2014/0256341 | A1* | 9/2014 | Nayeb Nazar | H04W 72/082 455/452.1 |
| 2020/0275279 | A1* | 8/2020 | Tangudu | H04L 63/1458 |
| 2020/0314701 | A1* | 10/2020 | Talebi Fard | H04W 36/0033 |
| 2020/0314731 | A1* | 10/2020 | Ryu | H04W 48/12 |

FOREIGN PATENT DOCUMENTS

| | | | |
|---|---|---|---|
| CN | 106028455 A | 10/2016 | |
| CN | 106341820 A | 1/2017 | |
| WO | 2014/124131 A2 | 8/2014 | |
| WO | WO-2014124131 A2 * | 8/2014 | ........ H04W 72/1215 |

* cited by examiner

WIRELESS COMMUNICATION METHOD AND WIRELESS COMMUNICATION DEVICE FOR MANAGING INTERFERENCE BETWEEN MULTIPLE DEVICES

CROSS-REFERENCE TO RELATED APPLICATIONS

The present application is based on PCT filing PCT/CN2018/105429, filed Sep. 13, 2018, which claims priority to CN 201710852689.4, filed Sep. 20, 2017, the entire contents of each are incorporated herein by reference.

FIELD

The present disclosure relates to a wireless communication method and a wireless communication device, and in particular, to a method and a device for allocating communication resource to a secondary system.

BACKGROUND

With the development of wireless communication technology, users are increasingly demanding for services with high-quality and high-speed, which results in demand for a large amount of communication resources (such as time, frequency, maximum transmission power, and the like). In order to make full use of the communication resource, a dynamic spectrum utilization technique has been developed, which dynamically utilizes spectrum resources that have been allocated to a certain service but are not fully utilized by the service. For example, spectrum of certain channels on which no program is played or spectrum of an adjacent channel in the digital television broadcast spectrum may be dynamically utilized to perform mobile communication without interfering with transmission of television signals. In this example, a digital television broadcast system may be referred to as a primary system, a television set may be referred to as a primary user, a mobile communication system that dynamically utilizes spectrum resources that are not being utilized is referred to as a secondary system, and a mobile communication terminal may be referred to as a secondary user.

That is, the primary system usually refers to a system that has a spectrum utilizing license, for example, the above television broadcast system. The secondary system usually refers to a system that does not have the spectrum utilizing license and may appropriately utilize a spectrum resource allocated to the primary system when it is not used by the primary system. In addition, the primary system and the secondary system may both have spectrum utilizing licenses, but may have different priorities in utilizing spectrums. For example, when an operator deploys a new base station to provide new service, an existing base station and its service may have priority in using spectrums. The primary system includes the primary user and a base station for the primary user. The secondary system includes the secondary user and a base station for the secondary user. Specifically, the base station for the secondary user may communicate with one or more secondary users, or multiple secondary users may communicate with each other in the secondary system.

In a communication scenario where the primary and secondary systems coexist, it is required that the communication of the secondary system should not adversely affect the communication of the primary system, or that the interference to the primary system caused by the secondary system utilizing the resource should be controlled to be within a range allowed by the primary system. In the case of multiple secondary systems, it is required that the aggregated interference caused by the multiple secondary systems should not exceed the range allowed by the primary system.

Therefore, it is desired to design a method of appropriately allocating communication resource to a secondary system while meeting a requirement of the primary system with respect to interference.

SUMMARY

In view of this, a device for managing multiple systems interfering with a reference point is provided according to the present disclosure, which includes one or more processors. The one or more processors is configured to: acquire a total amount of interference which the multiple systems are allowed to generate at the reference point, wherein the total amount of interference is determined by another device; and determine, based on the acquired total amount of interference, a communication resource for each of the multiple systems, such that interferences which the multiple systems generate at the reference point when performing communication using the communication resources are different from one another, and a sum of the interferences generated by the multiple systems is not more than the total amount of interference; and inform each system of the communication resource determined for the corresponding system.

In another aspect, a first device for managing multiple systems interfering with a reference point is provided according to the present disclosure, which includes one or more processors. The one or more processors is configured to: determine, among the multiple systems, a group of systems which are managed by a second device based on information related to the multiple systems; determine a total amount of interference which the group of systems are allowed to generate at the reference point, based on an interference limit allowable at the reference point; and inform the second device of the determined total amount of interference, such that the second device is able to determine a communication resource for each of the group of systems based on the total amount of interference.

In another aspect, a method executed by a second device for managing multiple systems interfering with a reference point is provided according to the present disclosure, which includes: acquiring a total amount of interference which the multiple systems are allowed to generate at the reference point, wherein the total amount of interference is determined by a first device; and determining, based on the acquired total amount of interference, a communication resource for each of the multiple systems, such that interferences which the multiple systems generate at the reference point when performing communication using the communication resources are different from one another, and a sum of the interferences generated by the multiple systems is not more than the total amount of interference; and informing each system of the communication resource determined for the corresponding system.

In another aspect, a method executed by a first device for managing multiple systems interfering with a reference point is provided according to the present disclosure, which includes: determining, among the multiple systems, a group of systems which are managed by a second device based on information related to the multiple systems; determining a total amount of interference which the group of systems are allowed to generate at the reference point, based on an interference limit allowable at the reference point; and informing the second device of the determined total amount of interference, such that the second device is able to determine a communication resource for each of the group of systems based on the total amount of interference.

In another aspect, a computer-readable medium including executable instructions is provided according to the present disclosure, which when being executed by an information processing machine, cause the information processing machine to execute the above method.

BRIEF DESCRIPTION OF THE DRAWINGS

The present disclosure may be understood better with reference to the detail description given in conjunction with the drawings in the following. The same or similar element is indicated by the same or similar reference numeral throughout all the drawings. The drawings together with the following detailed description are incorporated into and form a part of the specification and serve to further illustrate the preferred embodiments of the present disclosure and to explain the principle and advantages of the present disclosure by way of example. In the drawings.

DETAILED DESCRIPTION OF EMBODIMENTS

Figure 1:
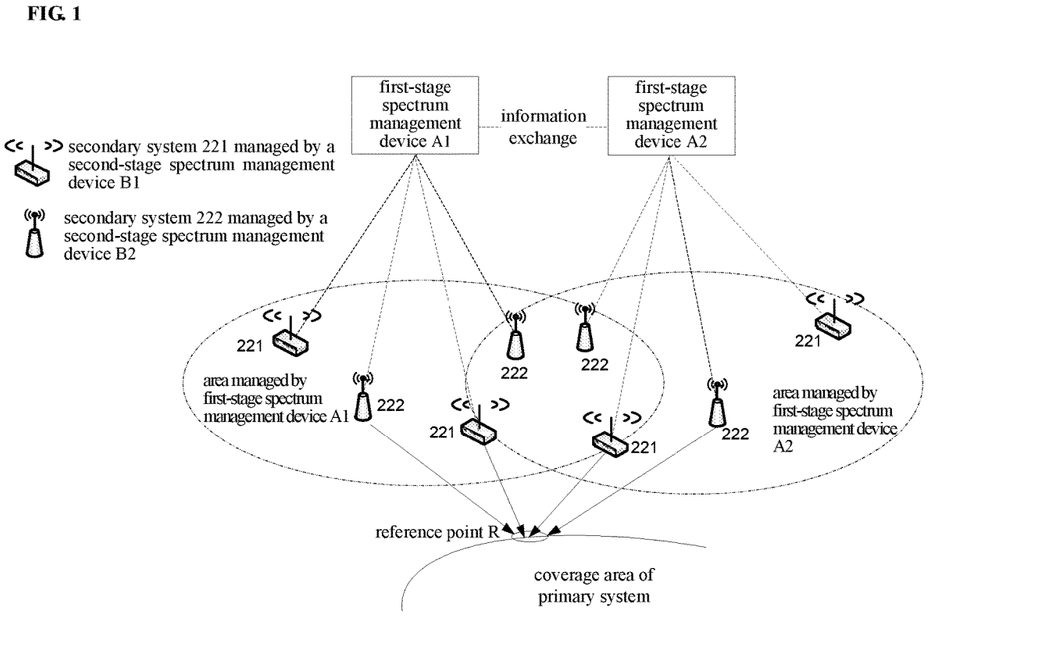
FIG. 1 schematically shows a communication scenario to which the present disclosure is applicable.

FIG. 1 schematically shows a communication scenario to which the technical solution of the present disclosure is applicable. In the communication scenario, there may be one or more first-stage spectrum management devices, and each of the first-stage spectrum management devices is configured to manage multiple secondary systems in a certain geographic area. FIG. 1 schematically shows only two first-stage spectrum management devices A1 and A2, and geographic areas respectively managed by the first-stage spectrum management devices A1 and A2 are indicated with dashed circles. It should be noted that the communication scenario to which the present disclosure is applicable may include more or less first-stage spectrum management devices than those shown in FIG. 1.

There are multiple secondary systems in each of management areas managed by the first-stage spectrum management devices A1 and A2, and the multiple secondary systems may be further managed by different second-stage spectrum management devices. FIG. 1 shows secondary systems 221 managed by a second-stage spectrum management device B1 and secondary systems 222 managed by a second-stage spectrum management device B2. It should be noted that there may also be a secondary system (not shown in FIG. 1) that is not managed by any second-stage spectrum management device in the management area of the first-stage spectrum management device A1.

In addition, FIG. 1 also schematically shows a coverage area of a primary system and a reference point R at an edge of the coverage area. The reference point R may be set at a position where the coverage area of the primary system is closest to a coverage area of the secondary system. The reference point R may represent a position where interference of the secondary system to the primary system is maximum. Therefore, the process of controlling the interference of the secondary system to the primary system to be within the range allowed by the primary system is generally performed by controlling the interference of the secondary system at the reference point R.

Each of the first-stage spectrum management devices A1 and A2 is configured to allocate available communication resources to the secondary systems in its management area. The first-stage spectrum management devices A1 and A2 may be, for example, spectrum allocation devices provided by a geographic location database operator authorized according to national regulations.

Each of the second-stage spectrum management devices B1 and B2 is configured to further determine a communication resource to be used for each secondary system within a range of available communication resources allocated to the secondary system. The second-stage spectrum management devices B1 and B2 may be, for example, spectrum allocation devices provided by a network operator or a network provider, or spectrum allocation devices provided by a network management organization in a specific area (such as office area, residential area and university campus).

Each of the second-stage spectrum management devices B1 and B2 does not prescribe which one of the first-stage spectrum management devices the secondary system under its management can access, but only determine a communication resource to be used by the secondary system among the available communication resources allocated to the secondary system.

As described above, there may be a secondary system that is not managed by any second-stage spectrum management device in the management areas of the first-stage spectrum management devices A1 and A2, and this secondary system may select by itself a resource for communication in the available communication resources allocated by the first-stage spectrum management device. In this case, however, there may be a problem that two secondary systems which are close to each other may select the same resource for communication, resulting in interference with each other. The second-stage spectrum management device may be arranged to solve this problem. Since the second-stage spectrum management device determines a communication resource to be actually used by each secondary system among the available communication resources allocated to the secondary system, the possibility of the secondary systems interfering with each other due to usage of the same resource can be effectively avoided.

A process of signaling interaction for allocating communication resources according to the first embodiment of the present disclosure will be described below with reference to FIG. 2.

Figure 2:
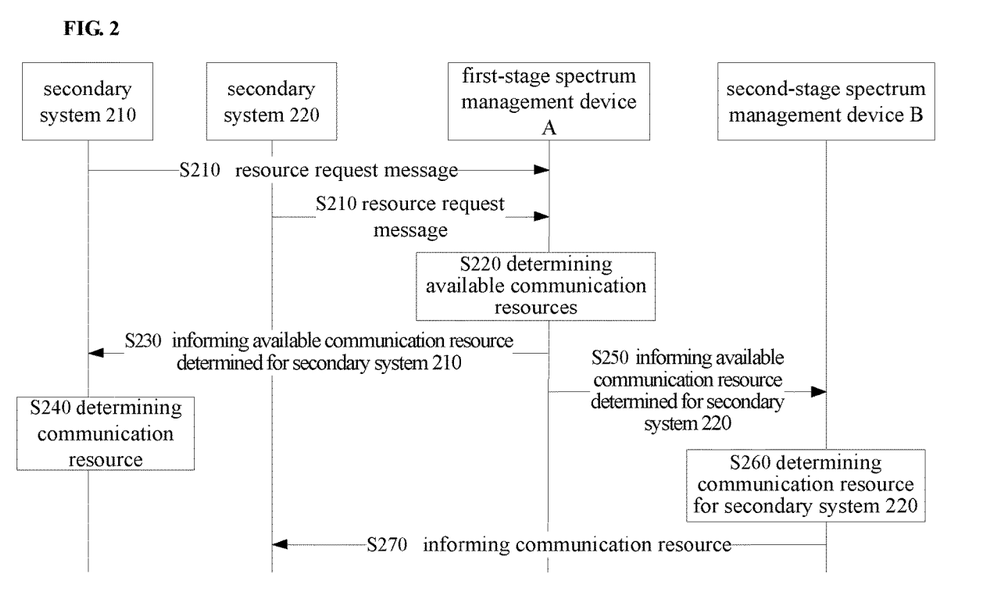
FIG. 2 is a diagram showing signaling interaction for allocating communication resources according to a first embodiment of the present disclosure.

As shown in FIG. 2, in step 210, in a case that communication is to be performed, the secondary system transmits a request message to the first-stage spectrum management device A for requesting allocation of resources. Specifically, the secondary system that transmits the request message may include a secondary system 210 that is not managed by a second-stage spectrum management device B and a secondary system 220 that is managed by the second-stage spectrum management device B.

The request message sent by the secondary system may include an identifier (ID) and position information of the secondary system. In addition, for the secondary system 220 that is managed by the second-stage spectrum management device B, the sent request message may further include information related to the second-stage spectrum management device B, such as an identifier (ID) and/or a management mechanism of the second-stage spectrum management device B. For example, the management mechanism of the second-stage spectrum management device B may include dynamic spectrum sensing, carrier sense multiple access (CSMA), long-term evolution-learning (LTE-LBT), and the like.

After receiving the request message from each of the secondary systems 210, 220, the first-stage spectrum management device A may determine available communication resources for the secondary systems based on information in the request messages, as shown in step S220. Herein, the communication resources may include, for example, time resources, spectrum resources, maximum transmit power, and the like.

For the secondary system 210 that is not managed by the second-stage spectrum management device B, the first-stage spectrum management device A may, in step S220, for example, determine available communication resources for the secondary system 210 based on allocable spectrum resources, requirement of the primary system (for example, signal to interference plus noise ratio acceptable at the reference point R), and path loss from the secondary system 210 to the primary system. It should be noted that those skilled in the art will readily understand that the first-stage spectrum management device A may also determine the available communication resources for the secondary system 210 based on other factors. Then, the first-stage spectrum management device A informs, in step S230, the secondary system 210 of the determined available communication resources, and the secondary system 210 selects, in step S240, a specific resource for communication in the received available communication resources.

For the secondary system 220 that is managed by the second-stage spectrum management device B, the process of step S220 in which the first-stage spectrum management device A determines available communication resource for the secondary system 220 will be described respectively by taking spectrum resource and maximum transmission power as two examples of the communication resource.

Figure 3:
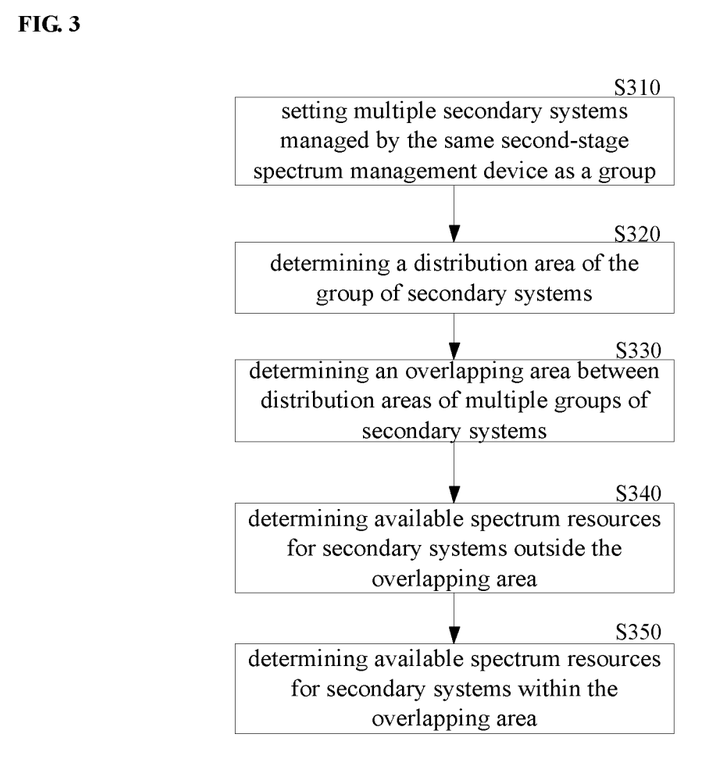
FIG. 3 is a flow chart showing a process for allocating available spectrum resources.

FIG. 3 shows a flowchart of a process for allocating available spectrum resources to the secondary system 220. After receiving request messages from multiple secondary systems 220, the first-stage spectrum management device A may determine an identifier and position information of each secondary system 220 based on the request message of the secondary system 220, and determined a correspondence between the secondary system 220 and the second-stage spectrum management device B that manages the secondary system 220. Further, the first-stage spectrum management device A may set multiple secondary systems 220 managed by the same second-stage spectrum management device B as one group, as shown in step S310. Then, for each group, the first-stage spectrum management device A may determine a distribution area of the group of secondary systems based on the position information of each secondary system in the group, as shown in step S320.

Figure 4:
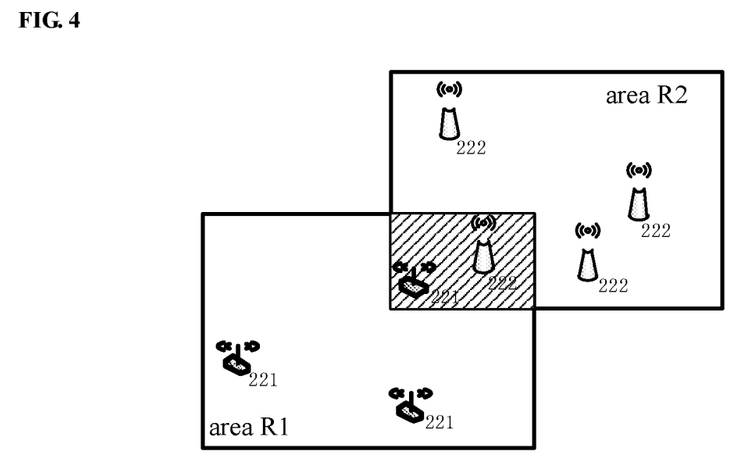
FIG. 4 schematically shows distribution areas of two groups of secondary systems determined by one first-stage spectrum management device.

FIG. 4 schematically shows distribution areas R1 and R2 of two groups of secondary systems determined by the first stage spectrum management device A. The secondary systems 221 in the area R1 are managed by the second-stage spectrum management device B1 (not shown), and the secondary systems 222 in the area R2 are managed by the second-stage spectrum management device B2 (not shown). As shown in FIG. 4, there is an overlapping area (a shaded portion) between the distribution areas R1 and R2, in which there are both the secondary system 221 and the secondary system 222. It should be noted that only one secondary system 221 and one secondary system 222 are schematically shown in the overlapping area in FIG. 4, but there may be a group of multiple secondary systems 221 and a group of multiple secondary systems 222 in the overlapping area.

In step S330 of FIG. 3, the first-stage spectrum management device A may determine the overlapping area based on for example positions of vertexes of the distribution areas R1 and R2. The distribution areas R1 and R2 each are shown as a rectangle in FIG. 4, but the distribution area may also be of an arbitrary polygon other than rectangle, and a common endpoint of two adjacent sides of the polygon is called a vertex of the polygon. The first-stage spectrum management device A may determine a distribution area of each group of secondary systems and an overlapping area among the multiple distribution areas with various methods known to those skilled in the art, which is not limited in the present disclosure.

Further, for the secondary systems outside the overlapping area, taking the secondary systems 221 in the area R1 outside the overlapping area as an example, since these secondary systems 221 are managed by the same second-stage spectrum management device B1, spectrum allocation for these secondary systems may be coordinated by the second-stage spectrum management device B1 to avoid interference between them due to the utilization of the same spectrum. In this case, the first-stage spectrum management device A may allocate available spectrum resources to each secondary system 221 in the area R1 outside the overlapping area by considering only the allocable spectrum resources, as shown in step S340. The same processing method is used for the secondary system 222 in the area R2 outside the overlapping area.

For the secondary system 221 and the secondary system 222 in the overlapping area, the first-stage spectrum management device A allocates available spectrum resources to the secondary system 221, 222 by considering the management mechanisms of the second-stage spectrum management devices B1 and B2 in addition to the allocable spectrum resources, as shown in step S350.

Specifically, when the second-stage spectrum management devices B1 and B2 both have a management mechanism for dealing with interference, for example, the second-stage spectrum management devices B1 and B2 both support carrier sense avoidance, the first-stage spectrum management device A may allocate the same available spectrum resources to all secondary systems 221, 222 in the overlapping area. Then, mutual interference between the two secondary systems is avoided by the respective interference management mechanisms of the second-stage spectrum management devices B1 and B2.

When at least one of the second-stage spectrum management devices B1 and B2 does not have the management mechanism for dealing with the interference, that is, at least one of the second-stage spectrum management devices B1 and B2 cannot deal with interference from a secondary system managed by another second-stage spectrum management device, the first-stage spectrum management device A may respectively allocate different spectrum resources for the secondary system 221 (a group of the secondary systems 221) and the secondary system 222 (a group of the secondary systems 222) in the overlapping area.

It should be noted that step S340 and step S350 may be performed in an order, which is not limited to that shown in FIG. 3, and may be performed in the reverse order or simultaneously. Further, if there is no overlapping area or there is no area outside the overlapping area, the processing of step S340 or step S350 may be omitted.

Hereinafter, a case where there is another first-stage spectrum management device (which is referred to as a first-stage spectrum management device A') in addition to the first-stage spectrum management device A is further described.

Figure 5:
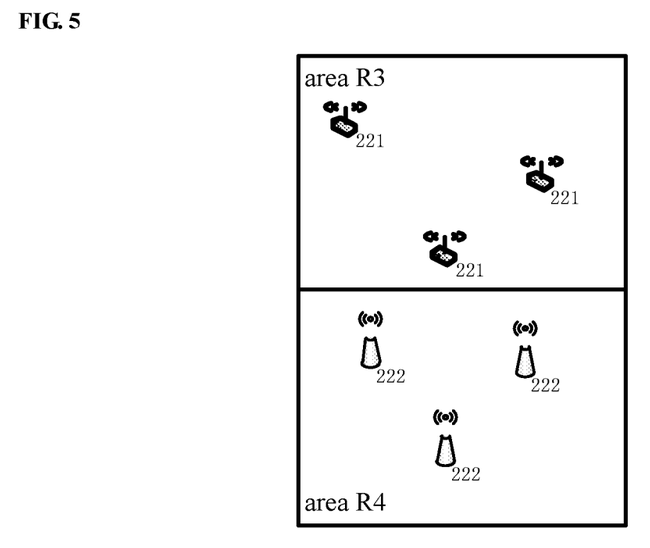
FIG. 5 schematically shows distribution areas of two groups of secondary systems determined by another first-stage spectrum management device.

The first-stage spectrum management device A' is configured to manage a geographic area different from that of the first-stage spectrum management device A, and perform operations similar to that of the first-stage spectrum management device A after receiving request messages from the multiple secondary systems 220. For example, FIG. 5 schematically shows distribution areas R3 and R4 of two groups of secondary systems determined by the first-stage spectrum management device A'. The secondary systems 221 in the area R3 are managed by the second-stage spectrum management device B1 (not shown), and the secondary systems 222 in the area R4 are managed by the second-stage spectrum management device B2 (not shown). As shown in FIG. 5, there is no overlapping area between the distribution areas R3 and R4.

Then, information interaction may be performed between the first-stage spectrum management device A and the first-stage spectrum management device A'. The information generated during the information interaction may include, for example, an identifier (ID) and/or management mechanism (such as dynamic spectrum sensing, CSMA, LTE-LBT) of the second-stage spectrum management device that manages each secondary system, and position information (for example, position information of a vertex of an area) of a determined distribution area of each groups of secondary systems.

Figure 6:
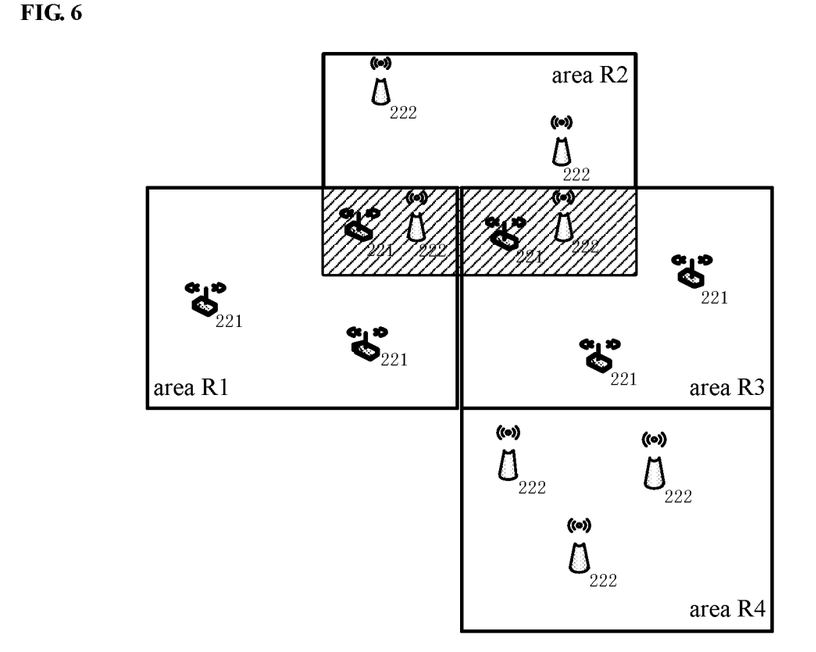
FIG. 6 schematically shows distribution areas of all groups of secondary systems in a management area of two first-stage spectrum management devices.

After performing the information interaction, each of the first-stage spectrum management device A and the first-stage spectrum management device A' may obtain the distribution of the multiple groups of secondary systems in the geographic area managed by the other first-stage spectrum management device, thus determining an overlapping area of the multiple groups of secondary systems in the areas (more comprehensive areas) managed by the two first-stage spectrum management devices. For example, FIG. 6 schematically shows distribution areas of respective groups of secondary systems in the management areas of the first-stage spectrum management devices A and A'. The secondary systems 221 in areas R1 and R3 are managed by the second-stage spectrum management device B1 (not shown), and the secondary systems 222 in areas R2 and R4 are managed by the second-stage spectrum management device B2 (not shown). In an overlapping area represented by a shaded portion, there are the secondary systems 221 managed by the second-stage spectrum management device B1 and the secondary systems 222 managed by the second-stage spectrum management device B2.

For the secondary systems 221, 222 in the overlapping area, available spectrum resources are determined by the first-stage spectrum management device A or the first-stage spectrum management device A' based on management mechanisms of the second-stage spectrum management devices B1 and B2. Similar to the above, if the second-stage spectrum management devices B1 and B2 each have a management mechanism for dealing with interference, all of the secondary systems in the overlapping area may be allocated with the same available spectrum resources. If at least one of the second-stage spectrum management devices B1 and B2 does not have the management mechanism for dealing with interference, a group of secondary systems 221 managed by the second-stage spectrum management devices B1 and a group of secondary systems 222 managed by the second-stage spectrum management device B2 may be allocated with different available spectrum resources.

After determining the available spectrum resources, referring back to FIG. 2, the first-stage spectrum management device A informs, in step S250, a second-stage spectrum management device B (including the second-stage spectrum management devices B1 and B2) that manages a secondary system 220 (including the secondary system 221 and the secondary system 222) of available spectrum resources determined for the secondary system 220. Then in step S260, the second-stage spectrum management device B determines a spectrum resource for the secondary system 220 to perform communication within a range of the received available spectrum resources. With the spectrum resource allocation of the second-stage spectrum management device B, communication quality of each of the secondary systems 220 managed by the second-stage spectrum management device B is optimized and minimum interference is generated. The second-stage spectrum management device B then informs, in step S270, the secondary spectrum system 220 of the determined spectrum resource.

The process of allocating communication resources are described above by taking a spectrum resource as an example. The process of allocating communication resources to a secondary system will be described below by taking a transmission power as an example of the communication resource. The interference generated by the secondary system to the primary system needs to be considered in determining transmission power for the secondary system.

Figure 7:
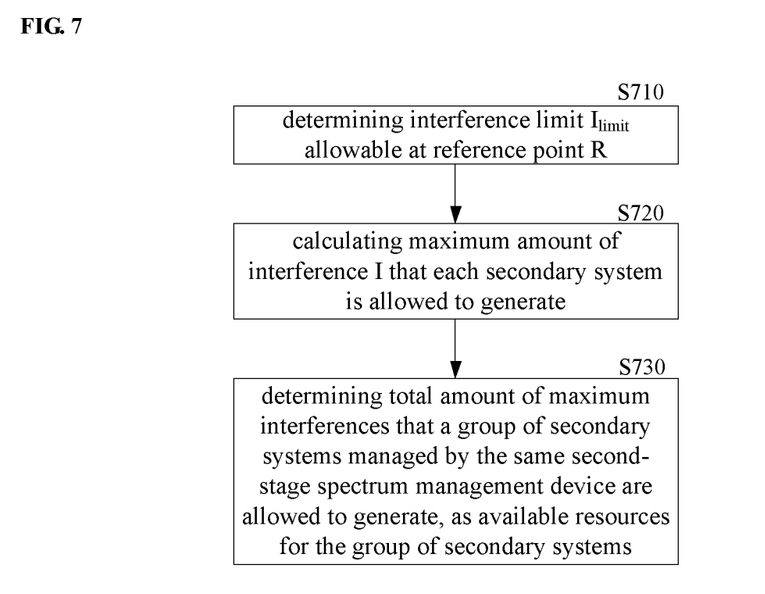
FIG. 7 is a flow chart showing a process for determining available communication resources.

FIG. 7 shows a flow chart of a process for determining available communication resources for a secondary system 220 managed by a second-stage spectrum management device B. Referring to FIG. 7, the first stage spectrum management device A first determines, in step S710, an interference limit $I_{limit}$ which is allowable at the reference point R (as shown in FIG. 1) in a coverage area of a primary system. The interference limit $I_{limit}$ represents a limit for the interference that the secondary system is allowed to generate to the primary system at the reference point R which is closest to a distribution area of the secondary system on the premise of ensuring the communication quality of the primary system. For example, the first-stage spectrum management device A may determine the interference limit $I_{limit}$ based on pre-stored information related to the primary system.

In addition to determining the interference limit $I_{limit}$ at the reference point R, the first-stage spectrum management device A also determines the number N of secondary systems within the geographic area managed by itself. It is assumed that the N secondary systems include N1 secondary systems managed by the second-stage spectrum management device B1 and N2 secondary systems managed by the second-stage spectrum management device B2, that is, N=N1+N2. Then, the first-stage spectrum management device A calculates, in step S720, a maximum allowable amount of interference I of each secondary system at the reference point R according to the following equation:

$$I=I_{limit}/N.$$

Then, the first-stage spectrum management device A may determine, in step S730, that the total amount of maximum interferences allowed to be generated by the N1 secondary systems managed by the second-stage spectrum management device B1 is represented as $I_{limit}*N1/N$, and that the total amount of maximum interferences allowed to be generated by the N2 secondary systems managed by the spectrum management device B2 is represented as $I_{limit}*N2/N$.

For each secondary system, a maximum transmit power of the secondary system may be determined based on the maximum allowable amount of interference I, distance between the secondary system and the reference point R, and path loss. That is, there is a correlation between the amount of interference and the transmission power. Therefore, the total amount of allowable maximum interferences determined for a group of secondary systems (for example, the N1 secondary systems or the N2 secondary systems) by the first-stage spectrum management device A may be regarded as available communication resources corresponding to the group of secondary systems.

After determining the available communication resources, referring back to FIG. 2, the first-stage spectrum management device A informs the second-stage spectrum management device B1 of the total amount of maximum interferences corresponding to the N1 secondary systems, $I_{limit}*N1/N$, as the available communication resources, and informs the second-stage spectrum management device B2 of the total amount of maximum interferences corresponding to the N2 secondary systems, $I_{limit}*N2/N$, as available communication resources, as shown in step S250.

Further, each of the second-stage spectrum management devices B1 and B2 determines a maximum allowable amount of interference for each of the group of secondary systems managed by itself based on the received total amount of maximum interferences, as shown in step S260. Taking the second-stage spectrum management device B1 as an example, the second-stage spectrum management device B1 determines a maximum allowable interference for each of the N1 secondary systems managed by itself based on the received total amount of maximum interferences, $I_{limit}*N1/N$. The maximum interference generated by one secondary system may be different from that of another, as long as a sum of maximum interferences generated by the N1 secondary systems is less than or equal to the total amount of maximum interferences $I_{limit}*N1/N$. For example, it may be allowed that each of one or more secondary systems of the N1 secondary systems generates interference greater than $I_{limit}/N$, while interference generated by each of the other secondary systems is less than $I_{limit}/N$, such that the aggregated interference caused by the N1 secondary systems at the reference point R is not greater than the total amount of maximum interferences $I_{limit}*N1/N$ determined by the first-stage spectrum management device A1.

For a secondary system, a large interference being allowable means that a large transmission power may be used, while a small interference being allowable means that the transmission power should be limited. The second-stage spectrum management device B1 may flexibly set the maximum transmission power for each secondary system by allocating the maximum allowable amount of interference in this manner. For example, a secondary system in a group of secondary systems that requires a high bandwidth to support high-speed data transmission may be provided with a high maximum transmission power while the maximum transmission power of other secondary systems are limited, in which case the aggregated interference generated by the group of secondary system at the reference point R may still be controlled to be within the range allowed by the primary system.

Then, the second-stage spectrum management device B1 informs, in step S270, the corresponding secondary system 220 of the determined maximum allowable interference, so that the secondary system 220 can determine the maximum transmission power based on the maximum allowable interference, distance between the secondary system 220 and the reference point R, and path loss. Alternatively, the operation of determining the maximum transmission power based on the maximum allowable interference generated by each secondary system 220 may also be performed by the second-stage spectrum management device B1, and the second-stage spectrum management device B1 may inform, in step S270, the corresponding secondary system 220 of the determined maximum transmission power.

Figure 8:
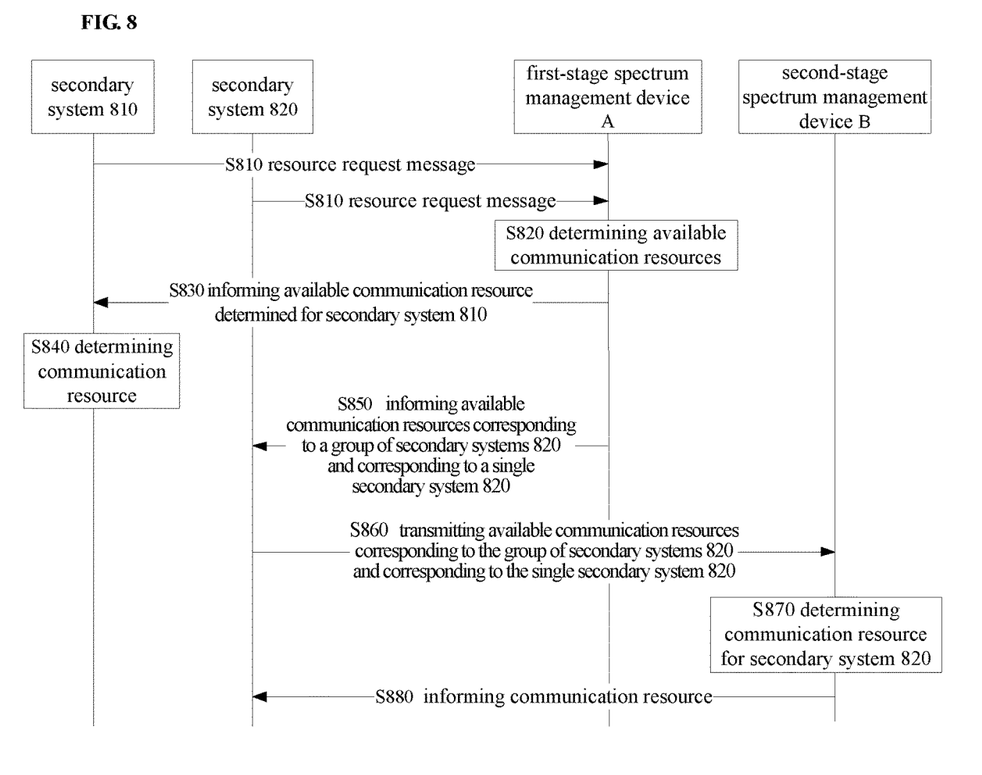
FIG. 8 is a diagram showing signaling interaction for allocating communication resources according to a second embodiment of the present disclosure.

FIG. 8 is a diagram showing a signaling interaction for allocating communication resources according to a second embodiment of the present disclosure. As shown in FIG. 8, in step 810, a secondary system (including a secondary system 810 that is not managed by the second-stage spectrum management device B and a secondary system 820 that is managed by the second-stage spectrum management device B) transmits a request message for requesting allocation of communication resources to the first-stage spectrum management device A.

Similarly to the first embodiment described in connection with FIG. 2, in this embodiment, the request message may include position information of the secondary system, and may further include information (such as ID, and a management mechanism) related to the second-stage spectrum management device B that manages the secondary system 820.

The first-stage spectrum management device A determines, in step S820, available communication resources for the secondary system based on the received request message. Similar to the first embodiment described in connection with FIG. 2, for the secondary system 810 that is not managed by the second-stage spectrum management device B, the first-stage spectrum management device A may determine available communication resources for the secondary system 810 based on for example allocable spectrum resources, requirement of the primary system (for example, signal to interference plus noise ratio acceptable at the reference point R) and path loss from the secondary system 810 to the primary system, and informs, in step S830, the secondary system 810 of the determined available communication resources. Then, the secondary system 810 may select, in step S840, a specific resource in the available communication resources for communication.

For the secondary system 820 that is managed by the second-stage spectrum management device B, the first-stage spectrum management device A may determine, in step S820, the available communication resources for the secondary system 820 in the manner described in the first embodiment. For example, for a group of secondary systems 820 managed by the same second-stage spectrum management device B, the first-stage spectrum management device A may determine a maximum amount of interference ($I_{limit}*N1/N$) corresponding to the group of secondary systems, and informs, in step S850, the respective secondary systems 820 in the group of secondary systems of the maximum amount of interference as available communication resources. Further, the first-stage spectrum management device A may also informs, in step S850, each secondary system 820 of the maximum amount of interference ($I_{limit}/N$) determined for the corresponding secondary system 820.

Then, each secondary system 820 transmits, in step S860, the received available communication resources corresponding to the group of secondary systems and the available communication resources determined for the corresponding secondary system 820 to the second-stage spectrum management device B that manages the corresponding secondary system 820.

Similarly to the first embodiment, the second-stage spectrum management device B may determine, in step S870, maximum allowable interference for each secondary system in a group of secondary systems based on the received maximum amount of interference corresponding to the group. It may be allowed that a maximum interference generated by one secondary system is different from that of another secondary system, as long as a sum of maximum interferences generated by all of the secondary systems does not exceed the total amount of maximum interferences. The difference from the first embodiment is that, in this process, the second-stage spectrum management device B also needs to consider the received maximum amount of interference corresponding to each secondary system.

Then, the second-stage spectrum management device B informs, in step S880, each secondary system 820 of the communication resources determined for the corresponding secondary system 820, such that the secondary system 820 can perform communication with the communication resources. For example, the second-stage spectrum management device B may informs, in step S880, each secondary system 820 of the maximum allowable interference determined for the corresponding secondary system 820 as communication resources, such that the secondary system 820 can determine the maximum transmission power based on the maximum allowable interference, distance between the secondary system 820 and the reference point R, and path loss. Alternatively, the operation of determining the maximum transmission power based on the maximum allowable interference may also be performed by the second-stage spectrum management device B, and the second-stage spectrum management device B may inform, in step S880, the corresponding secondary system 820 of the determined maximum transmission power as the communication resources.

The various devices or modules described herein are only in the logical sense and do not strictly correspond to any physical devices or entities. For example, the function of each module described herein may be implemented by multiple physical entities, or the functions of multiple modules described herein may be implemented by a single physical entity. In addition, the features, components, elements, steps, and the like described in one embodiment are not limited to the embodiment, but may also be applied to other embodiments, for example, by replacing specific features, components, elements, and steps in the other embodiments or combining with the specific features, components, elements, and steps in the other embodiments.

The series of processes executed by each device or module in the above-described embodiments may be implemented by software, hardware, or a combination of the software and the hardware. Programs included in the software may be stored in advance in a storage medium provided inside or outside each device. As an example, during execution, these programs are written to a random access memory (RAM) and executed by a processor (for example, a CPU).

Figure 9:
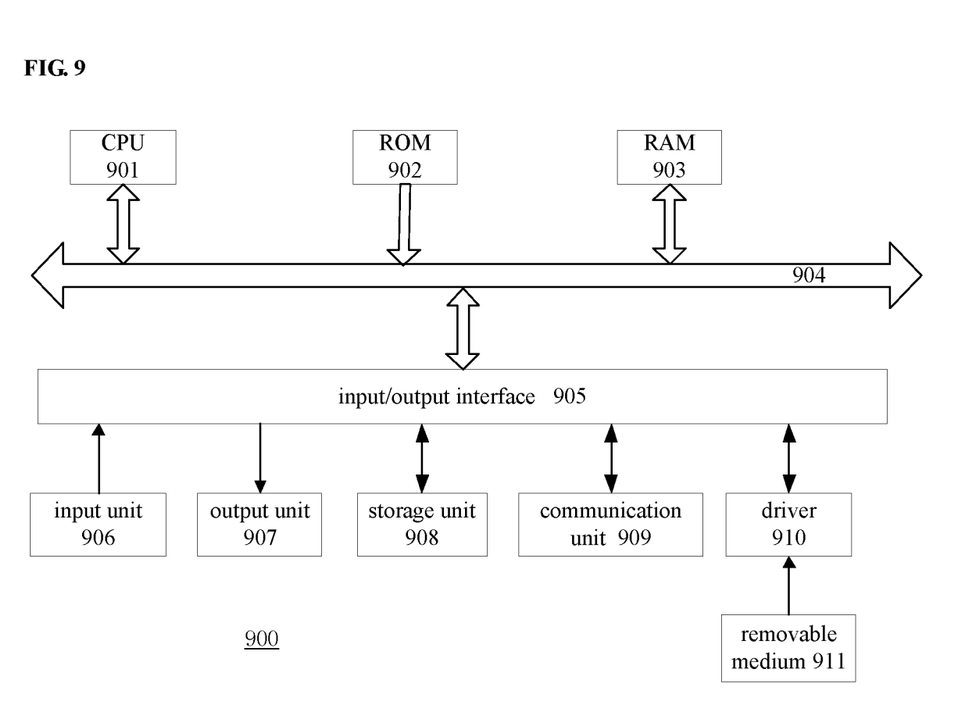
FIG. 9 is a block diagram showing an exemplary configuration of computer hardware for implementing technical solutions of the present disclosure.

FIG. 9 is a block diagram showing an exemplary configuration of computer hardware that executes the above-described processes according to a program.

In computer 900, central processing unit (CPU) 901, read only memory (ROM) 902, and random access memory (RAM) 903 are connected to each other by bus 904.

The input/output interface 905 is further connected to the bus 904. The input/output interface 905 is connected with the following components: input unit 906 including keyboard, mouse, microphone and the like; output unit 907 including display, speaker and the like; storage unit 908 including hard disk, nonvolatile memory and the like; communication unit 909 including network interface card (such as local area network (LAN) card, modem); and drive 910 driving removable medium 911 such as magnetic disk, optical disk, magneto-optical disk or semiconductor memory.

In the computer having the above configuration, the CPU 901 loads the program stored in the storage unit 908 into the RAM 903 via the input/output interface 905 and the bus 904 and executes the program, to execute the above-described processes.

A program to be executed by a computer (the CPU 901) may be recorded on the removable medium 911 which is a package medium including, for example, magnetic disk (including floppy disk), optical disk (including compact disk-read only memory (CD-ROM), digital versatile disk (DVD) and the like), magneto-optical disk or semiconductor memory. In addition, the program to be executed by the computer (the CPU 901) may also be provided via a wired or wireless transmission medium such as local area network, the internet or digital satellite broadcasting.

In a case where the removable medium 911 is installed in the drive 910, the program may be installed in the storage unit 908 via the input/output interface 905. In addition, the program may be received by the communication unit 909 via a wired or wireless transmission medium, and the program may be installed in the storage unit 908. Alternatively, the program may be installed in the ROM 902 or the storage unit 908 in advance.

The program to be executed by the computer may be a program that executes the processes in the order described in the present specification, or may be a program that executes the processes in parallel or executes the process when needed (such as when called).

The embodiments and the technical effects of the present disclosure are described in detail above with reference to the accompanying drawings, but the scope of the present disclosure is not limited thereto. It is to be understood by those skilled in the art that various modifications or changes can be made to the embodiments described herein without departing from the spirit and scope of the present disclosure depending on design requirements and other factors. The scope of the present disclosure is defined by the appended claims or their equivalents.

In addition, the present disclosure may also be configured as follows.

A device for managing multiple systems interfering with a reference point, which includes one or more processors configured to: acquire a total amount of interference which the multiple systems are allowed to generate at the reference point, wherein the total amount of interference is determined by another device; and determine, based on the acquired total amount of interference, a communication resource for each of the multiple systems, such that interferences which the multiple systems generate at the reference point when performing communication using the communication resources are different from one another, and a sum of the interferences generated by the multiple systems is not more than the total amount of interference; and inform each system of the communication resource determined for the corresponding system.

The total amount of interference is determined by the other device based on an interference limit allowable at the reference point.

The communication resource includes a maximum transmission power of the system.

The processor is further configured to: acquire available spectrum resources allocated to the multiple systems by the another device; and determine a spectrum resource for communication for each of the multiple systems based on the acquired available spectrum resources.

The system is a secondary system, and the reference point is a position in an area of a primary system where the interference of the secondary system is maximum.

A first device for managing multiple systems interfering with a reference point, which includes one or more processors configured to: determine, among the multiple systems, a group of systems which are managed by a second device based on information related to the multiple systems; determine a total amount of interference which the group of systems are allowed to generate at the reference point, based on an interference limit allowable at the reference point; and inform the second device of the determined total amount of interference, such that the second device is able to determine a communication resource for each of the group of systems based on the total amount of interference.

The information related to the multiple systems includes an identifier and position information of each system, and an identifier of the second device managing each system.

The second device includes multiple second devices. The processor is further configured to: determine, among the multiple systems, multiple groups of systems respectively managed by the multiple second devices, based on the information related to the multiple systems; determine a distribution area for each group of systems based on position information of respective systems in each group of systems; and determine an overlapping area among multiple distribution areas of the multiple groups of systems based on vertex positions of the multiple distribution areas.

The first device manages the multiple systems in a specific area. The processor is further configured to: interact with another first device which manages multiple systems in another area to acquire multiple distribution areas of multiple groups of systems in the another area determined by the another first device; and determine an overlapping area among the multiple distribution areas of the multiple groups of systems in the specific area and the multiple distribution areas of the multiple groups of systems in the another area.

The information related to the multiple of systems further includes: a management mechanism of the second device managing each system. The processor is further configured to: allocate available spectrum resources to the multiple groups of systems in the overlapping area respectively based on the management mechanisms of the multiple second devices managing the multiple groups of systems in the overlapping areas; and inform the multiple second devices managing the multiple groups of systems of the allocated available spectrum resources respectively.

The processor is further configured to allocate the same available spectrum resource to the multiple groups of systems in the overlapping area when the multiple second devices have the management mechanism for dealing with the interference.

The processor is further configured to allocate different available spectrum resources to different groups of systems in the overlapping area when at least one of the multiple second devices does not have the management mechanism for dealing with the interference.

The processor is further configured to: allocate the available spectrum resources to the systems outside the overlapping area; and inform the second device managing the systems outside the overlapping area of the allocated available spectrum resources.

The processor is further configured to: allocate available spectrum resources to the systems which are not managed by the second device among the multiple systems; and inform the systems which are not managed by the second device of the allocated available spectrum resources.

The system is a secondary system, and the reference point is at a position in an area of a primary system where the interference of the secondary system is maximum.

A method executed by a second device for managing multiple systems interfering with a reference point, which includes: acquiring a total amount of interference which the multiple systems are allowed to generate at the reference point, wherein the total amount of interference is determined by a first device; and determining, based on the acquired total amount of interference, a communication resource for each of the multiple systems, such that interferences which the multiple systems generate at the reference point when performing communication using the communication resources are different from one another, and a sum of the interferences generated by the multiple systems is not more than the total amount of interference; and informing each system of the communication resource determined for the corresponding system.

The communication resource includes a maximum transmission power of the system.

The method further includes: acquiring available spectrum resources allocated to the multiple systems by the first device; and determining a spectrum resource for communication for each of the multiple systems based on the acquired available spectrum resources.

A method executed by a first device for managing multiple systems interfering with a reference point, which includes: determining, among the multiple systems, a group of systems which are managed by a second device based on information related to the multiple systems; determining a total amount of interference which the group of systems are allowed to generate at the reference point, based on an interference limit allowable at the reference point; and informing the second device of the determined total amount of interference, such that the second device is able to determine a communication resource for each of the group of systems based on the total amount of interference.

The information related to the multiple systems includes an identifier and position information of each system, and an identifier of the second device managing each system.

The second device includes multiple second devices. The method further includes: determining, among the multiple systems, multiple groups of systems respectively managed by the multiple second devices, based on the information related to the multiple systems; determining a distribution area for each group of systems based on position information of respective systems in each group of systems; and determining an overlapping area among multiple distribution areas of the multiple groups of systems based on vertex positions of the multiple distribution areas.

The first device manages the multiple systems in a specific area. The method further includes: interacting with another first device which manages multiple systems in another area to acquire multiple distribution areas of multiple groups of systems in the another area determined by the another first device; and determining an overlapping area among the multiple distribution areas of the multiple groups of systems in the specific area and the multiple distribution areas of the multiple groups of systems in the another area.

The information related to the multiple systems further includes: a management mechanism of the second device managing each system. The method further includes: allocating available spectrum resources to the multiple groups of systems in the overlapping area based on the management mechanisms of the multiple second devices managing the multiple groups of systems in the overlapping areas; and informing the multiple second devices managing the multiple groups of systems of the allocated available spectrum resources respectively.

The method further includes: allocating the same available spectrum resource to the multiple groups of systems in the overlapping area when the multiple second devices have the management mechanism for dealing with the interference; and allocating different available spectrum resources to different groups of systems in the overlapping area when at least one of the multiple second devices does not have the management mechanism for dealing with the interference.

A computer-readable medium including executable instructions, which when being executed by an information processing machine, cause the information processing machine to execute the above described method.

The invention claimed is:

1. A first device for managing a plurality of systems interfering with a reference point, comprising one or more processors configured to:
    determine, among the plurality of systems, a group of systems which are managed by a second device based on information related to the plurality of systems;
    determine a total amount of interference which the group of systems are allowed to generate at the reference point, based on an interference limit allowable at the reference point; and
    inform the second device of the determined total amount of interference, such that the second device is able to determine a communication resource for each of the group of systems based on the total amount of interference,
    wherein the second device comprises a plurality of second devices, and the processor is further configured to:
        determine, among the plurality of systems, a plurality of groups of systems respectively managed by the plurality of second devices, based on the information related to the plurality of systems;
        determine a distribution area for each group of systems based on position information of respective systems in each group of systems; and
        determine an overlapping area among a plurality of distribution areas of the plurality of groups of systems based on vertex positions of the plurality of distribution areas.

2. The first device according to claim 1, wherein the information related to the plurality of systems comprises an identifier and position information of each system, and an identifier of the second device managing each system.

3. The first device according to claim 1,
    wherein the first device manages the plurality of systems in a specific area,
    wherein the processor is further configured to:
        interact with another first device which manages a plurality of systems in another area to acquire a plurality of distribution areas of a plurality of groups of systems in the another area determined by the another first device; and
        determine an overlapping area among the plurality of distribution areas of the plurality of groups of systems in the specific area and the plurality of distribution areas of the plurality of groups of systems in the another area.

4. The first device according to claim 1,
    wherein the information related to the plurality of systems further comprises a management mechanism of the second device managing each system,
    wherein the processor is further configured to:
        allocate available spectrum resources to the plurality of groups of systems in the overlapping area respectively based on the management mechanisms of the plurality of second devices managing the plurality of groups of systems in the overlapping areas; and
        inform the plurality of second devices managing the plurality of groups of systems of the allocated available spectrum resources respectively.

5. The first device according to claim 4, wherein the processor is further configured to:
    allocate the same available spectrum resource to the plurality of groups of systems in the overlapping area when the plurality of second devices have the management mechanism for dealing with the interference.

6. The first device according to claim 4, wherein the processor is further configured to:
    allocate different available spectrum resources to different groups of systems in the overlapping area when at least one of the plurality of second devices does not have the management mechanism for dealing with the interference.

7. The first device according to claim 1, wherein the processor is further configured to:
    allocate the available spectrum resources to systems outside the overlapping area; and
    inform the second device managing the systems outside the overlapping area of the allocated available spectrum resources.

8. The first device according to claim 1, wherein the processor is further configured to:
    allocate available spectrum resources to systems which are not managed by the second device among the plurality of systems; and
    inform the systems which are not managed by the second device of the allocated available spectrum resources.

9. A method of managing, by a first device including one or more processors, a plurality of systems interfering with a reference point, the method comprising:
    determining, among the plurality of systems, a group of systems which are managed by a second device based on information related to the plurality of systems;
    determining a total amount of interference which the group of systems are allowed to generate at the reference point, based on an interference limit allowable at the reference point; and informing the second device of the determined total amount of interference, such that the second device is able to determine a communication resource for each of the group of systems based on the total amount of interference, wherein the second device comprises a plurality of second devices, and the method further comprises:

determining, among the plurality of systems, a plurality of groups of systems respectively managed by the plurality of second devices, based on the information related to the plurality of systems;

determining a distribution area for each group of systems based on position information of respective systems in each group of systems; and determining an overlapping area among a plurality of distribution areas of the plurality of groups of systems based on vertex positions of the plurality of distribution areas.

10. The method according to claim 9, wherein the first device manages the plurality of systems in a specific area, wherein the method further comprises:

interacting with another first device which manages a plurality of systems in another area to acquire a plurality of distribution areas of a plurality of groups of systems in the another area determined by the another first device; and determining an overlapping area among the plurality of distribution areas of the plurality of groups of systems in the specific area and the plurality of distribution areas of the plurality of groups of systems in the another area.

11. The method according to claim 9, wherein the information related to the plurality of systems further comprises: a management mechanism of the second device managing each system, wherein the method further comprises:

allocating available spectrum resources to the plurality of groups of systems in the overlapping area based on the management mechanisms of the plurality of second devices managing the plurality of groups of systems in the overlapping areas; and informing the plurality of second devices managing the plurality of groups of systems of the allocated available spectrum resources respectively.

12. The method according to claim 11, the method further comprising:

allocating the same available spectrum resource to the plurality of groups of systems in the overlapping area when the plurality of second devices have the management mechanism for dealing with the interference; and allocating different available spectrum resources to different groups of systems in the overlapping area w % ben at least one of the plurality of second devices does not have the management mechanism for dealing with the interference.

* * * * *